Jan. 2, 1951   F. TURRETTINI   2,536,706
DEVICE FOR THE MEASUREMENT OF LENGTHS
Filed Dec. 18, 1947
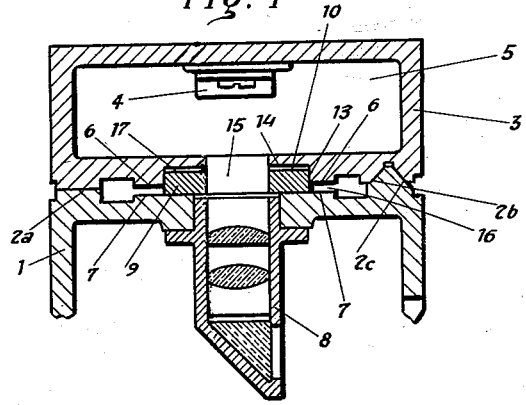
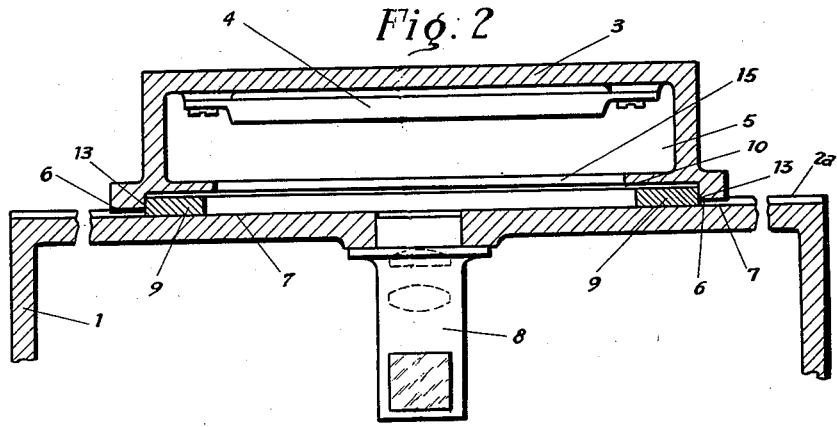
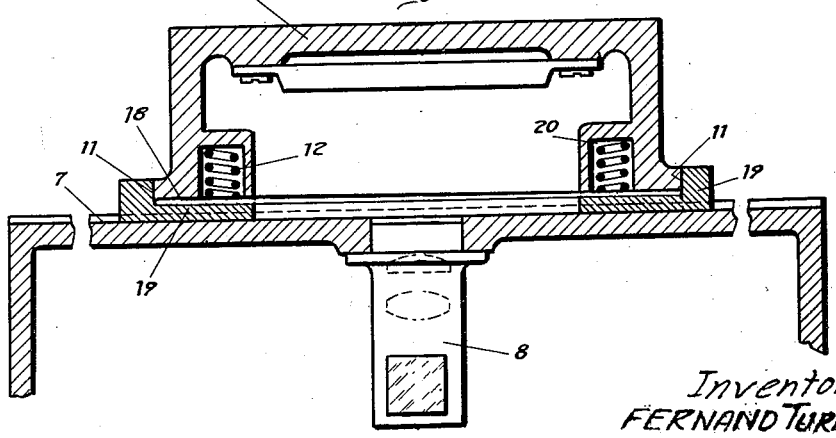
Inventor
FERNAND TURRETTINI.
By Robert E. Burns
Attorney

UNITED STATES PATENT OFFICE 2,536,706

DEVICE FOR THE MEASUREMENT OF LENGTHS

Fernand Turrettini, Bellevue-Geneva, Switzerland, assignor to Societe Genevoise d'Instruments de Physique, Geneva, Switzerland, a Swiss firm Application December 18, 1947, Serial No. 792,429
In Switzerland May 21, 1941

Section 1, Public Law 690, August 8, 1946
Patent expires May 21, 1961

3 Claims. (Cl. 33—1)

The present invention relates to devices for the measurement of lengths, and more particularly to devices of this kind for use in measuring machines or in precision machine-tools provided with a slide movable on a carrier, the said slide having a recess open towards the carrier and containing a graduated scale to be observed through the aperture of the slide by means of an optical device such as, for instance, a microscope or a projector, mounted on the said carrier. In these devices, the graduated scale is located in an enclosed space so that it is protected against entrance of dust from the outside. Moreover, when the slide is shiftable on a horizontal carrier, the dust which is in suspension in the air contained in the enclosed space cannot fall onto the graduated scale which is directed downwardly, soil it and thus hinder the observation.

However, in order that the slide enclosing the scale be tightly sealed, it is necessary that the contact surface between the slide and the carrier on which it moves be dust-proof. Some difficulties arise then, which are due to the lubricant with which this contact surface has necessarily to be oiled to prevent the slide from jamming during its sliding movements. This lubricant tends to penetrate into the optical lenses of the observation device sighting the scale through the aperture in the slide.

It is an object of the present invention to obviate this inconvenience by suppressing the lubrication. According to certain features of the invention, a clearance is provided all round the aperture in the slide, between the carrier and the slide and a frame surrounds this aperture. This frame is mounted in the slide in such a way that it does not bear the weight of the slide, and it rests against the carrier. This frame is preferably made as light as possible; it rests on the carrier by its own weight or may be pressed against the same by means of weak springs. It will thus slide with dry friction on the carrier, thus avoiding the use of lubricant which would soil the optical parts of the observation device; the frame may be preferably made of a material adapted to support dry friction without risk of jamming.

In the accompanying drawings there are illustrated by way of examples two practical embodiments of the present invention.

Fig. 1 is a cross section of a first measuring device embodying the invention.

Fig. 2 is a longitudinal section thereof, and

Fig. 3 is a longitudinal section of a modified construction of this device.

Referring to the drawings, 1 denotes the bed of a machine, for instance of a measuring machine or of a precision tool; 3 is a slide shiftably mounted on the bed 1 and bearing on the guiding surfaces 2ᵃ, 2ᵇ, and 2ᶜ of the bed, which surfaces have necessarily to be lubricated because they support the whole weight of the slide. The slide is provided with a recess 5 constituting the enclosed space on the bottom wall of which is fixed a graduated scale 4. The recess 5 is open towards the bed 1, as at 15. The graduated scale 4 may be observed through the aperture 15 by means of a microscope mounted in the bed 1 and the objective of which is shown at 8.

There is a clearance 16 provided of purpose all round the aperture 15, between the lower side 6 of the slide 3 and the non-bearing surface 7 of the bed 1. Moreover, a frame 9 is mounted in a recess 17 provided in the slide 3 and surrounds the aperture 15. However a clearance 10 is provided between the upper surface of this frame and the bottom 14 of the recess 17. The frame 9 constitutes a longitudinal and transverse sealing packing with the side walls 13 of the recess 17. The clearance 10 prevents the frame from being pressed against the surface 7 of the bed 1 by the weight of the slide 3. The frame 9 follows all of the displacements of the slide 3 and rests by its own weight only on the non-bearing surface 7 thus constituting a slight slipping joint adapted to prevent entrance of dust in the recess 5 through the clearance 16 provided of purpose between the slide 3 and the non-bearing surface 7 of the bed 1.

The frame 9 does not need lubrication to slide without damage on the surface 7 and one obtains in this way the result sought of tightly sealing the recess 5 provided in the slide 3 for the graduated scale by realizing a close sealing contact with the non-bearing surface 7 without having the optical parts of the microscope in danger of being soiled by a lubricant which is no longer necessary.

The frame 9 is made of a single piece.

In the modified construction shown in Fig. 3, the frame 19 is constituted of several juxtaposed elements forming a sealing joint in the longitudinal direction with the outer faces 11 of the slide by passing through slots 18 provided in the right and left side walls of the slide; transversely, the arrangement is like the arrangement shown in Fig. 1. By 12 are indicated weak springs lodged in recesses 20 of the slide 3 and intended to press resiliently the frame 19 against the non-bearing surface 7 of the bed 1. This arrangement may be useful when the non-bearing surface 7 is not located in a horizontal plane.

What I claim is:

1. In a device for the measurement of lengths, the combination with the bed of an instrument or machine of an optical observation device carried by said bed and providing a line of sight through the bed, a slide shiftable on said bed and having a recess open towards said optical device and provided with a bottom, a graduated scale secured to said slide in said recess in front of the aperture thereof for observation by said optical device, there being a clearance provided all round the aperture of the slide between the adjacent sufaces of said slide and of said bed, and a frame in said slide surrounding said aperture and slidably engaging the bed, there being a clearance between the upper surface of said frame and the bottom of said recess in such a way that the frame does not bear the weight of the slide while it rests on said bed, whereby said recess of the slide and said optical device are tightly sealed against entrance of dust and lubricant.

2. In a device for the measurement of lengths, the combination with the bed of an instrument or machine, of an optical observation device carried by said bed, a slide shiftable on the surface of said bed, this latter being provided with an observation aperture for said optical device, an elongated first recess in said slide, this latter having an elongated aperture towards said bed in alignment with said observation aperture thereof, a graduated scale secured to said slide in said recess in front of said elongated aperture for observation by said optical device, a second recess all round said elongated aperture in the slide between the adjacent surfaces of said slide and of said bed, a frame fitted in said second recess and in sealing contact with the side walls but spaced from the bottom of said second recess and slidably engaging said bed, whereby said frame is caused to bear on said bed by its own weight only, exclusive of the weight of said slide.

3. In a device for the measurement of lengths, the combination with the bed of an instrument or machine, of an optical observation device carried by said bed, a slide shiftable on the surface of said bed, this latter being provided with an observation aperture for said optical device, an elongated first recess in said slide, this latter having an elongated aperture towards said bed in alignment with said observation aperture thereof, a graduation scale secured to said slide in said recess in front of said elongated aperture for observation by said optical device, a second recess provided all round said elongated aperture in the slide between the adjacent surfaces of said slide and of said bed, a frame of less thickness than said second recess surrounding said elongated aperture and slidably engaging said bed, said frame being on two opposite sides in sealing contact with the outer surfaces of the side walls of the slide, and springs mounted in the side walls of said slide and pressing said frame against said bed without said frame bearing the weight of said slide.

FERNAND TURRETTINI.

REFERENCES CITED

The following references are of record in the file of this patent:

UNITED STATES PATENTS

| Number | Name | Date |
|---|---|---|
| 832,775 | Coe | Oct. 9, 1906 |
| 1,956,366 | Vedovell | Apr. 24, 1934 |
| 1,991,177 | Rutz et al. | Feb. 12, 1935 |
| 2,068,199 | Seletsky | Jan. 19, 1937 |
| 2,311,142 | Turrettini | Feb. 16, 1943 |
| 2,471,050 | Turrettini | May 24, 1949 |

FOREIGN PATENTS

| Number | Country | Date |
|---|---|---|
| 549,582 | Germany | Apr. 29, 1932 |
| 881,606 | France | Jan. 28, 1943 |
| 890,003 | France | Feb. 16, 1943 |